United States Patent
Suzuki et al.

[15] 3,662,548
[45] May 16, 1972

[54] FLUID CONTROL SYSTEM FOR VEHICLES

[72] Inventors: Akira Suzuki; Tadataka Narumi, both of Kariya, Japan

[73] Assignee: Toyoda Koki Kabushiki Kaisha, Aichi-Ken, Japan

[22] Filed: June 1, 1970

[21] Appl. No.: 42,120

[30] Foreign Application Priority Data

June 5, 1969 Japan..................44/44189

[52] U.S. Cl..................60/51, 60/52 S, 91/412, 137/101
[51] Int. Cl..................F15b 1/02
[58] Field of Search..................60/52 S, 52 B, 51; 91/412; 137/101, 118

[56] References Cited

UNITED STATES PATENTS

| | | |
|---|---|---|
| 2,462,983 | 3/1949 | MacDuff et al..................60/52 S UX |
| 2,799,996 | 7/1957 | Van Meter..................60/52 S UX |
| 2,956,405 | 10/1960 | Spalding et al..................60/52 S X |
| 3,039,266 | 6/1962 | Schenkelberger..................60/97 E UX |
| 3,370,602 | 2/1968 | Nelson..................60/52 S UX |

Primary Examiner—Edgar W. Geoghegan
Attorney—Wenderoth, Lind & Ponack

[57] ABSTRACT

In a vehicle engine driven pump the output flow of the pump is increased in proportion to an increase in the engine speed. The increased output flow of the pump is regulated by a metering orifice and a control valve for bypassing a surplus quantity of the pump output flow to maintain the fluid volume downstream of the metering orifice at a predetermined constant volume. The constant volume downstream of the metering orifice is divided into two portions by means of a proportional distributing valve, one portion being supplied to a first pressure fluid actuated device through a check valve and the other portion to a second pressure fluid actuated device. An unloading valve and an accumulator are connected to the first pressure fluid actuated device to assure supply of the pressurized fluid under a constant pressure.

3 Claims, 1 Drawing Figure

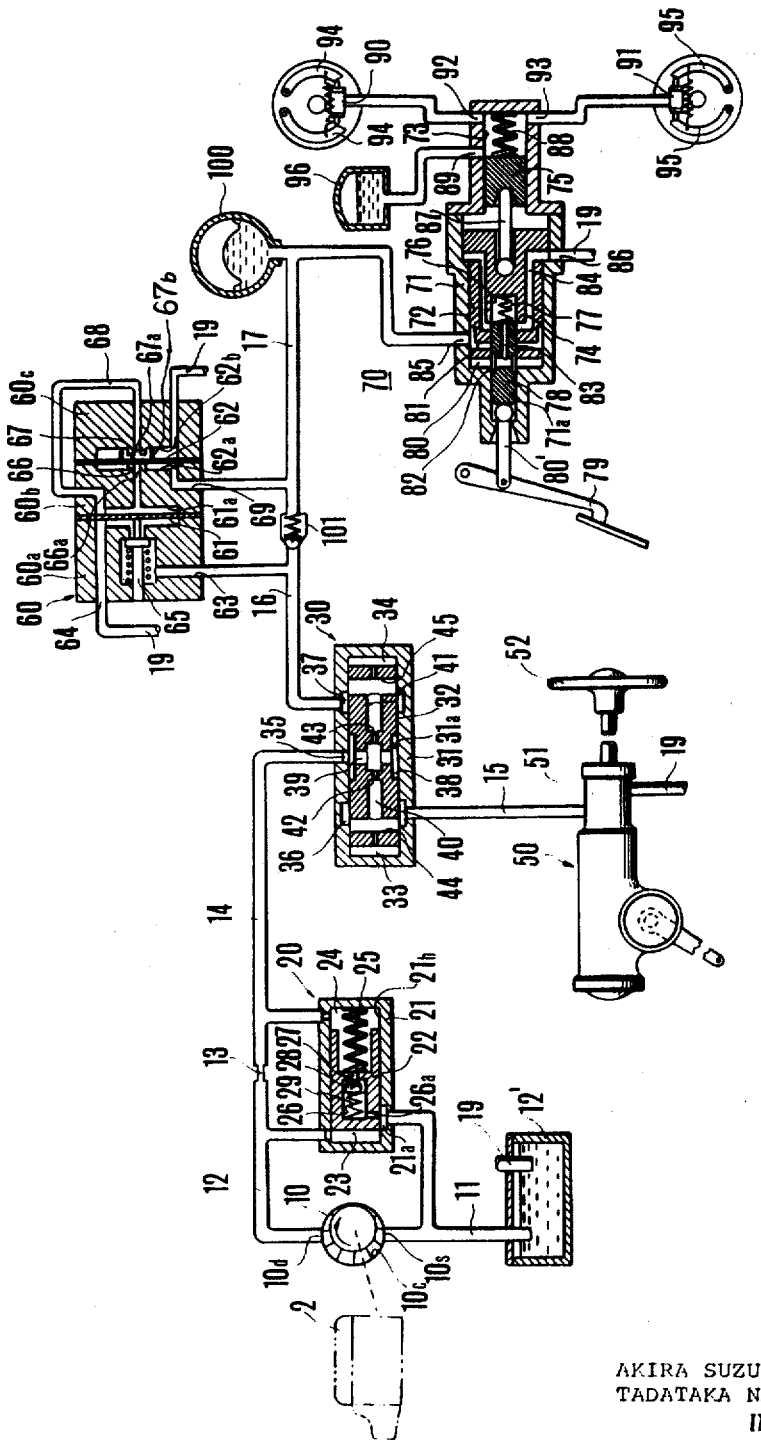

3,662,548

FLUID CONTROL SYSTEM FOR VEHICLES

BACKGROUND OF THE INVENTION

This invention relates to a fluid control system utilizing a pump driven by a vehicle engine as a source of pressurized fluid, and more particularly to a fluid control system capable of actuating independently two pressure fluid actuated devices.

A pump driven by a vehicle engine generally varies its number of revolutions from a relatively low speed range to a relatively high speed range and yet is required to have a substantially constant output flow over its entire speed range. However, since the pump driven by a vehicle engine is usually a constant displacement type of relatively simple construction, its output quantity per unit time increases with its speed. For this reason, if the pump is designed to have a capacity to provide an output flow sufficient in the low speed range, the output flow would be surplus in the high speed range. Under a no load condition, unless such a surplus output is returned to a reservoir, the power loss consumed in the pump will become unduly excessive causing undesirable temperature rise of the fluid as well as troubles in vehicle running.

In a prior art pump for a power steering device, the surplus fluid other than a substantially constant volume of fluid required for operating the steering device is bypassed to the reservoir through a flow control valve of very low resistance to decrease wasteful power loss consumed in the pump. For this reason, such a pump is effective for only one fluid actuated device such as a power steering device, and is not suitable to operate independently a plurality of pressure fluid actuated operating devices.

SUMMARY OF THE INVENTION

It is an object of this invention to provide a novel fluid control system for a pump driven by a vehicle engine which can operate independently a plurality of pressure fluid actuated devices such as a power steering device, a power braking device or the like.

Another object of this invention is to provide a fluid control system for supplying a constant fluid flow to one of the pressure fluid actuated devices irrespective of whether or not the other device is operative.

According to a preferred embodiment of this invention there is provided a fluid control system for a vehicle comprising a pump driven by an engine of said vehicle, a metering orifice connected to the output of said pump, a flow control valve to bypass surplus a quantity of the pump output to maintain the flow quantity downstream of said metering orifice at a substantially constant volume, a proportional distributing valve to divide said constant volume into two portions at a predetermined ratio, a first pressure fluid actuated device such as a power steering device operated by one of said portions, a second pressure fluid actuated device such as a power braking device operated by the other of said portions, a check valve and an accumulator associated with a conduit interconnecting said proportional distributing valve and said second pressure fluid actuated device for passing said other portion of said fluid, and an unloader valve connected to said conduit between said proportional distributing valve and said check valve, said check valve preventing reverse flow of the fluid from said accumulator to said proportional valve when said unloading valve operates, and said unloading valve bypassing said other portion of the fluid in response to the pressure in said accumulator.

BRIEF DESCRIPTION OF THE DRAWING

The invention can be more fully understood from the following description when taken in conjunction with the accompanying drawing in which a single FIGURE shows a fluid control circuit partly in section, embodying this invention.

DESCRIPTION OF THE PREFERRED EMBODIMENT

In the illustrated embodiment, a constant displacement pump 10, shown as a rotary pump, is driven by a vehicle engine 2 through a V belt and the like at a speed which is proportional to the number of revolutions of the engine. A suction port 10s of the pump is connected to a reservoir or oil tank 12' through a conduit 11. A discharge port 10d of the pump is communicated with a flow control valve 20 and a proportional distributing valve 30 through conduits 12 and 14. A metering orifice 13 is interposed between conduits 12 and 14 to apply the pressurized fluids through the metering orifice to pressure chambers 23 and 24, respectively, on the opposite ends of flow control valve 20 to move a spool 22 slidable received in a bore 21h of the valve housing 21. A compression spring 25 is received in the pressure chamber 24 of the flow control valve 20 which receives the fluid downstream of metering orifice 13 to force spool 22 in a direction to close a port 21a opening through the wall of valve housing 21. Thus, spool 22 responds to the pressure difference across metering orifice 13 to control the opening of port 21a to by-pass a portion of the pump output fluid back to suction port 10S. Consequently, the pressure difference across metering orifice 13 is maintained at a constant value set by the force of spring 25 whereby the fluid flow downstream of orifice 13 is maintained at a constant volume and the surplus fluid is returned to the suction port 10s through the port 21a and conduit 11.

A hollow bore 26 is formed in spool 22, which is communicated with pressure chamber 24 through an opening 27 normally closed by a ball valve 28 urged by a spring 29. The bore 26 is also communicated with port 21a through a small radial opening 26a so that when the pressure in pressure chamber 24 exceeds a predetermined value set by spring 29, ball 28 is opened to relieve the pressure through port 21a. Consequently, the pressure in the pressure chamber 24 decreases to move spool 22 to the right to open port 21a. Thus the output flow of the pump bypassed through port 21a is increased to prevent the discharge pressure of the pump from exceeding the set value. In this manner, ball valve 28 functions as a pressure relief valve, the operating point thereof being predetermined by spring 29.

The proportional distributing valve 30 connected to the conduit 14 functions to distribute the fluid, which has been regulated to a fixed flow quantity by the flow control valve 20, between conduits 15 and 16 at a prescribed ratio. Valve 30 comprises a valve housing 31 and a spool 32 contained in a bore 31a and having chambers 33 and 34 at its opposite ends. An inlet port 35 communicating with the conduit 14 and the bore 31a is provided at the center of the valve housing 31 and distributing ports 36 and 37 are formed on the opposite sides of inlet port 35. Port 36 is communicated with a servo-valve 51 of a power steering device 50 via a conduit 15 while port 37 is connected to an unloading valve 60 via a conduit 16. Spool 32 has a small diameter portion 38 at its center and a pair of axially extending openings 40 and 41 are formed in the spool at right angles with respect to a radial opening 39 at the small diameter portion 38. An axial orifice 42 is provided between openings 39 and 40 and a radial opening 44 is provided at the opposite end of opening 40 which is opened in the peripheral surface of spool 32 to align with distributing port 36. In the same manner an axial orifice 43 is formed between openings 39 and 41 and a radial opening 45 is formed at the opposite end of opening 41 which is opened in the peripheral surface of spool 32 to align with distributing port 37. Pressure chambers 33 and 34 are communicated with openings 40 and 41, respectively, through small openings at the ends of the spool so that opposite ends of the spool 32 are acted upon by static pressure of fluids flowing into openings 40 and 41 through orifices 42 and 43, respectively. Thus, spool 32 is moved by the difference between static pressure to vary the area of the openings of distributing ports 36 and 37 so that the pressure drop of the fluid passing through respective orifices 42 and 43 becomes equal. As a consequence the quantities of the fluid flowing through distributing ports 36 and 37 are distributed in proportion to the ratio of the effective flow areas of orifices 42 and 43. Assuming that the ratio of the effective flow area of orifices 42 and 43 is 3:1, then when the flow quantity of the flow control valve 20 is set to 8 liter/min. by metering orifice 13. Port 36 will pass 6 liter/min. while port 37 2 liter/min. As a consequence, fluid of the quantity of 6 liter/min. will be supplied to servo-valve 51 of power steering device 50 through conduit 15.

Under the neutral condition of servo-valve 51, or under the noload condition of the power steering device 50, the fluid is discharged to a return conduit 19 to oil tank 12' with a very small flow resistance so that the pressure in conduit 15 is maintained at very low pressure. Although the power steering device 50 connected to conduit 15 is shown as of an integral type comprising an integral assembly of servo-valve 51, a power cylinder and a steering gear mechanism (Not shown), it will be understood that any one of many well known types of power steering devices can be used.

Unloading valve 60 connected to conduit 16 is of the diaphragm type comprising a first diaphragm 61 and a second diaphragm 62 clamped between valve bodies 60a and 60b and valve bodies 60b and 60c respectively. A poppet valve 65 is disposed to contact one side of first diaphragm 61 to control the communication between an inlet port 63 and a discharge port 64, and a first valve seat 66 and a second valve seat 67 are disposed to selectively contact the opposite sides of the second diaphragm 62. An opening 66a of the first valve seat 66 is communicated with a pressure chamber 61a on the opposite side of the first diaphragm 61 while an opening 67a of the second valve seat 67 is also communicated with the same pressure chamber 61a through a conduit 68. A valve chamber 62a containing the first valve seat 66 is communicated with a pilot inlet port 69 while a valve chamber 62b containing the second valve seat 67 is connected to return pipe 19. A spring 67b is seated in valve chamber 62b to urge second diaphragm 62 to thereby close the opening 66a. A check valve 101 is connected between inlet port 63 and pilot inlet port 69 and accumulator 100 and a power braking device 70 are connnected to a check valve 101 via a conduit 17.

The main body 71 of power braking device 70 is formed with a power cylinder 72 and a master cylinder 73 respectively slidably receiving a power piston 74 and a master piston 75. Power piston 74 is formed with an internal bore 76 to receive spool valve 78 urged by a compression spring 77. The outer end of spool valve 78 is also slidably received in a cylindrical portion 71a of main body 71 to engage a push rod 80' of a brake pedal 79. Spool valve 78 and power piston 74 are provided with a notch 82 and a passage 81, respectively, which function to communicate a chamber 80 on the left hand side of power piston 74 with an inlet port 85 for the fluid when brake pedal 79 is depressed, and provided with a passage 83 and a passage 84, respectively, which function to communicate chamber 80 with a discharge port 86 when the brake pedal 79 is released. A connecting rod 87 is interposed between power piston 74 and master piston 75. A spring 88 is contained in master cylinder 73 to urge master piston 75. Master cylinder 73 is also formed with a port 89 opened and closed by the movement of piston 75 and ports 92 and 93 communicating with brake cylinders 90 and 91, respectively. Each of brake cylinders 90 and 91 contains a pair of pistons connected to brake shoes 94 and 95 to expand them by the fluid pressure. Port 89 is connected to an oil reservoir 96 to supplement the braking oil to master cylinder 73.

In operation, the fluid discharged by pump 10 is regulated to a constant flow quantity or volume by the action of the metering orifice 13 and flow control valve 20, and the regulated quantity of the fluid downstream of the metering valve 13 is supplied to proportional distributing valve 30 through the conduit 14. Any surplus quantity of the fluid is bypassed to the suction side of the pump through port 21a. The proportional valve 30 operates to distribute the regulated quantity of the fluid between power steering device 50 through conduit 15 and power braking device 70 through conduits 16 and 17 at a prescribed ratio.

For the control valve 51 of power steering device 50 is normally used a control valve of the open center type wherein conduit 15 is communicated with return pipe 19 at the neutral position of the control valve 51 (or the natural reset position of the handle). Thus, the fluid supplied through conduit 15 is discharged to the oil tank 12' through return pipe 19 without being opposed by any appreciable resistance. When control valve 51 is operated by handle 52 to connect the conduit 15 to one of the ports of the power cylinder, a pressure is generated in the port corresponding to the load applied to the steering device. Then the pressure in conduits 14 and 15 also increases to move spool valve 22 of flow control valve 20 to the left as viewed in the drawing to decrease the opening of port 21a bypassing surplus fluid. As a result the discharge pressure of the pump created in conduit 12 is increased to a pressure corresponding to the load applied to the steering device.

In the unloading valve 60, when the pilot admission pressure in chamber 62a is lower than a predetermined pressure set by the spring 67b the first valve seat 66 is closed by the second diaphragm 62 whereas the second valve seat 67 is opened as shown. Then the fluid in pressure chamber 61a is discharged to the oil tank 12' through conduit 68, the chamber 62b and conduit 19 to decrease the fluid pressure acting on the first diaphragm 61 thus closing poppet valve 65. On the other hand an increase in the pilot admission pressure above the predetermined pressure set by spring 67b causes the second diaphragm 62 to move to the right to close the second valve seat 67 and open the first valve seat 66 to rapidly increase the fluid pressure in pressure chamber 61a. This causes the first diaphragm 61 to open poppet valve 65. In this manner, when the poppet valve 65 is opened the conduit 16 is communicated with return conduit 19 or unloaded, but when valve 65 is closed conduit 16 is communicated with the conduit 17 through the check valve 101 or loaded.

Even during the unloaded condition of unloading valve 60, when actuated by handle 52 the control valve 51 of power steering device 50 is caused by proportional valve 30 to increase the pressure in conduit 15 irrespective of the pressure in conduit 16 and the proportion of divided flows is maintained at the predetermined value set by orifices 42 and 43. The power braking device 70 is supplied with the fluid accumulator in accumulator 100 and the communication between conduit 17 and discharge port 86 is interrupted while the braking device is not operative. Therefore, since the check valve 101 prevents reverse flow from the accumulator 100 to the proportional valve 30, accumulator 100 is maintained under high pressure. Upon depression of brake pedal 79 the fluid pressure acting upon power piston 74 forces master piston 75 toward the right to expand brake shoes 94 and 95 thus applying the braking forces. When the pressure in the accumulator decreases below the set value by the operation of the brake, poppet valve 65 is closed again and the pressurized fluid flows into conduit 17 by the opening of check valve 101. Fluid in conduit 17 is supplied to power braking device 70 and at the same time stored in the accumulator 100. When accumulator 100 is filled poppet valve 65 is again opened to unload conduit 16.

In this manner, while both power steering device 50 and power braking device 70 are inoperative, the portions of the fluid distributed to ports 36 and 37 are directly discharged to oil tank 12' respectively through control valve 51 and unloader value 60 so that the pressure in conduit 14 and 12 is maintained at a low valve thus greatly decreasing the pump operating power. Further, whether either one of the devices 50 and 70 is operative or not the operation of the other is assured so that safe running of the vehicle is always assured.

While the invention has been shown and described in terms of a preferred embodiment thereof it will be clear that many changes and modifications may be made within the scope of the invention as defined in the appended claims.

What is claimed is:

1. A fluid control system for a vehicle comprising a pump driven by an engine of said vehicle, a metering orifice connected to the output of said pump, a flow control valve means positioned across said metering orifice for bypassing a portion of the output flow of said pump to maintain the quantity of fluid downstream of said metering orifice at a substantially constant volume, a proportional distributing valve means located downstream of said flow control valve means for continuously dividing said constant volume of fluid into two passages at a predetermined ratio, a power steering device connected to one of said passages, a power braking device connected to the other of said passages, an accumulator positioned between said distributing valve means and said power braking device, a check valve means positioned upstream of said accumulator for preventing reverse flow of fluid from said accumulator to said distributing valve means, and unloading valve means positioned between said distributing valve means and said check valve means for bypassing the flow of fluid in said other passage in response to the pressure in said accumulator.

2. A fluid control system for a vehicle as claimed in claim 1, wherein said proportional distributing valve means comprises a housing; a spool slidably received in said housing, said spool having a chamber therein for receiving said constant quantity of fluid downstream of said metering orifice; a first orifice between said chamber and said power steering device; and a second orifice between said chamber and said power braking device, the effective areas of said first and second orifices being set at said predetermined ratio.

3. A fluid control system for a vehicle as claimed in claim 1, wherein said unloading valve means comprises a housing; a poppet valve means in said housing for bypassing, when opened, the flow from said distributing valve means; a first diaphragm clamped at the periphery thereof by said housing and engaging at the central portion thereof with said poppet valve means for controlling opening and closing of said poppet valve means; and a second diaphragm clamped at the periphery thereof by said housing for controlling the movement of said first diaphragm in response to the pressure in said accumulator.

* * * * *